Fig. 2

Aug. 4, 1942. R. PATERAS PESCARA 2,292,288
MEANS FOR DRIVING THE PROPELLING SYSTEM OF AIRCRAFT
Filed May 31, 1938 5 Sheets-Sheet 4

Inventor:
Raul Pateras Pescara,
Bailey Carson
Attorneys

Patented Aug. 4, 1942

2,292,288

UNITED STATES PATENT OFFICE 2,292,288

MEANS FOR DRIVING THE PROPELLING SYSTEM OF AIRCRAFT

Raul Pateras Pescara, Paris, France, assignor of one-tenth to Societe d'Etudes et de Participations Eau, Gaz, Electricite, Energie, S. A., Geneva, Switzerland, a society of Switzerland Application May 31, 1938, Serial No. 211,010
In Luxemburg June 2, 1937

12 Claims. (Cl. 170—135.5)

The present invention relates to means for driving the propelling system of an aircraft, and it is more especially, although not exclusively, concerned with means of this kind for use in connection with aircrafts intended to fly at high altitudes, that is to say aircrafts involving the problem of adaptation of the speed of revolution of the propeller to its axial velocity, as a function of the altitude.

The object of the present invention is to provide driving means of the type above described, which are better adapted to the requirements of practice.

A further object of the invention is to provide a driving installation for propellers of aircraft which avoids the use of variable pitch propellers and change speed transmissions, while at the same time permitting any desired regulation of the power of the unit independently of the speed of the propeller. The arrangement so provided is simple and of light weight. The invention contemplates the use of a free piston motor compressor which is capable of delivering at all times, as a function of the altitude, the quantity of gas under pressure necessary to drive the propeller at its greatest efficiency.

The essential feature of the present invention consists in having the propelling system of the aircraft driven by a receiving machine fed with motive gas under pressure by means of at least one motor-generator, preferably of the free piston type, and providing a system for regulating, as a function of the altitude, the rate of compression of the whole of the compression elements of the motor-generator, this regulation being preferably effected automatically and in such manner that the law of variation of the power of said motor-generator substantially ensures the constancy of the ratio of the velocity of the aircraft and of the speed of revolution of said propelling system.

According to another feature of the present invention, the means for driving the propelling system includes at least one motor-generator feeding gas under pressure to a receiving machine, the compressor part of said motor generator including, on the one hand, at least one main element having a rate of compression independent of the altitude, and, on the other hand, at least one auxiliary element, the ratio of compression of which is regulable, this auxiliary element being advantageously located ahead of the main element, and automatically regulated as a function of the altitude in such manner as to maintain the inlet pressure of said main element at a uniform value.

Still another feature of the present invention consists in having recourse, for driving said auxiliary element, to a machine, such for instance as a turbine, disposed ahead of the receiving machine coupled with the propelling system of the aircraft, the whole being advantageously designed in such manner that the motive gases expand, from the constant outlet pressure of the receiving machine, down to the external pressure, with a rate of expansion approximately equal to the rate of compression of the auxiliary compressor element.

Still another feature of the present invention consists, while having recourse to a generator-receiving machine system for driving the propeller, in regulating the power of said system by varying the amount of fuel burned in its compressed air circuit, the supplementary variable amount of fuel being introduced behind the driving elements of the generator, and even in the utilization turbine itself.

Still another feature of the present invention consists in providing the motor-propelling system of an aircraft with a device capable of regulating or limiting the amount of fuel that is introduced, preferably in an automatic manner as a function of the temperature of the motive gases, in such manner that the temperatures existing in the system remain always compatible with a good working of the latter.

Other features of the present invention will result from the following detailed description of some specific embodiments thereof.

Preferred embodiments of the present invention will be hereinafter described, with reference to the accompanying drawings, given merely by way of example, and in which.

Figure 1:
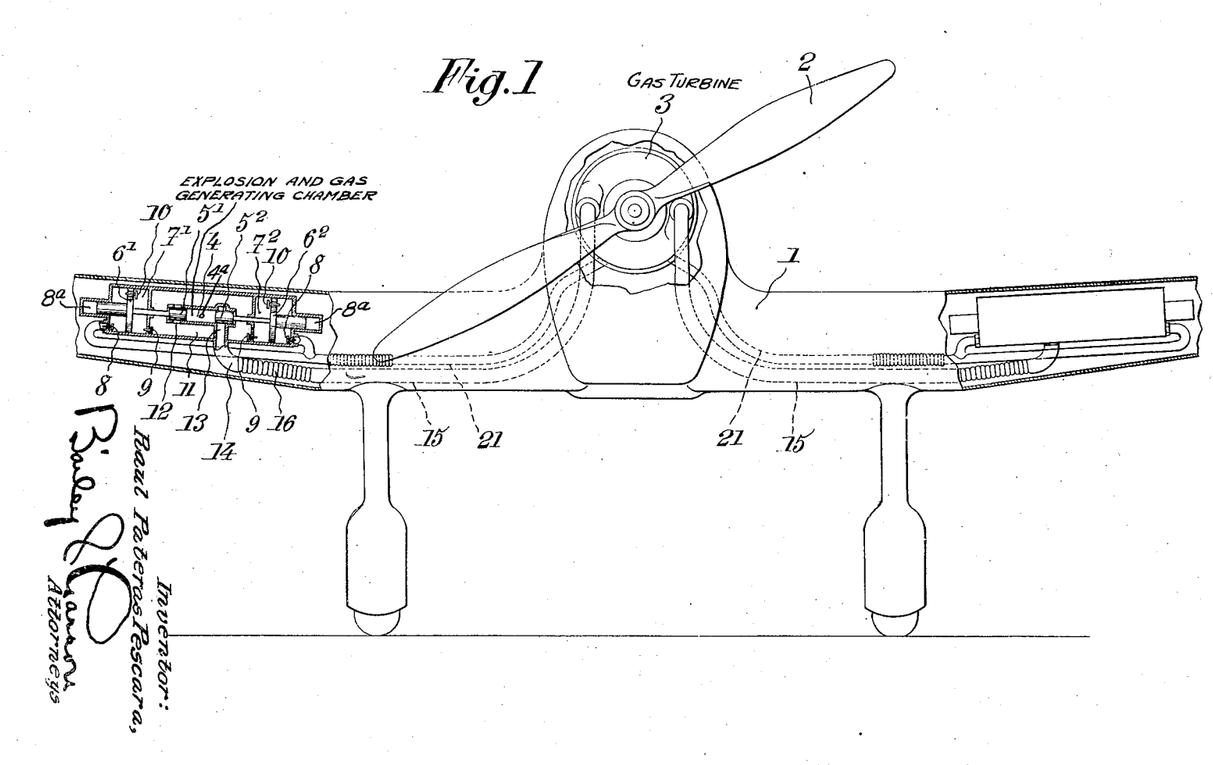
Fig. 1 shows, in a diagrammatic manner, in front view, with parts cut away, an aircraft provided with a propelling system driven according to the present invention.

The present invention concerns means for driving the propelling system, for instance the propeller 2 of an aircraft 1 intended, for instance, to fly at high altitudes.

This propeller is coupled on a receiving machine fed with fluid under pressure, such for instance as a gas turbine 3.

This turbine is driven by means of a motor generator of gas under pressure, the power of which can be regulated, preferably in an automatic manner as a function of the altitude, for instance by means of an adjustable ratio feed compressor, said motor-generator being advantageously constituted by a free piston machine, preferably of the auto-generator type, that is to say of a type in which the whole or a part of the air compressed in the compressor element serves for the scavenging and the feed of the motor element before being sent to the receiving turbine.

Such an auto-generator can be made in any usual manner and, in particular, as diagrammatically shown by the drawings.

In this embodiment, I fit in a two-cycle motor cylinder 4 fed with fuel by passage 4a two motor pistons $5^1$ and $5^2$ coacting respectively with two compressor pistons $6^1$ and $6^2$, in cylinders $7^1$ and $7^2$ provided with suction valves 8 fed through pipe 21 by a precompressor driven by gas turbine 3, as shown in the other figures of the drawings, and discharge valves 9, one-way transfer valves 10 being provided for the passage of the compressed gas from one face of the pistons to the opposite face, these valves opening during movement of the piston only for the passage of gas therethrough towards the interior of the unit and preventing any return flow. Upon each explosion within the motor cylinder, the motor pistons are driven outward and move pistons $6^1$, $6^2$ outward. Valves 10 open and gas moves into the inner spaces of cylinders $7^1$, $7^2$. The pistons are returned by the pressure built up in cushions 8a, and as valves 10 are now closed the gas is driven into space 11.

The compressor elements of the machine feed the compressed gases into a fluid-tight casing 11 which surrounds the motor cylinder 4.

I further provide, in said cylinder, inlet ports 12 and exhaust ports 13, which are respectively uncovered by each of the motor pistons in the vicinity of the ends of their outward strokes, the outlet ports opening into an exhaust conduit 14.

I may, of course, have recourse to a plurality of auto-generators made as just above described, for feeding a common turbine 3 with gas under pressure. In particular, as illustrated by Fig. 1, I may provide two similar generator machines, in which case it is advantageous to mount them respectively in each of the wings of the aircraft or in any other advantageous place facilitating the balancing or the distribution of the loads of the aircraft. Each of the auto-generators is then connected with the turbine through a conduit 15 which is preferably fitted with a flexible portion 16 adapted to absorb deformations due to expansions.

According to the present invention, the power of the means serving to drive propeller 2 is then regulated in such manner as to obtain, at all altitudes, the maximum efficiency of the propeller.

It is known that the efficiency of a propelling system such as that constituted by a propeller depends solely upon the ratio of the velocity $v$ of the aircraft and of the peripheral speed $n.D$ of the propeller ($n$ being the number of revolutions of the propeller and $D$ the diameter of the propeller).

On the other hand, the ratio $$\frac{v}{n.D}$$

is given by the equation:

$$\frac{v}{n.D}=k\frac{1}{Cx}$$

in which $k$ is a coefficient which characterizes the aircraft for a given propeller and $Cx$ is the unitary drag coefficient of an aircraft.

It results from this equation that the ratio $$\frac{v}{n.D}$$

and therefore the efficiency of the propeller, cannot remain exactly constant if $Cx$ itself does not remain constant. Furthermore, it would be easy to show that, $Cx$ remaining constant, the power supplied to the propeller must also be kept constant. This condition results from known equations concerning propellers and gliders.

Figure 2:
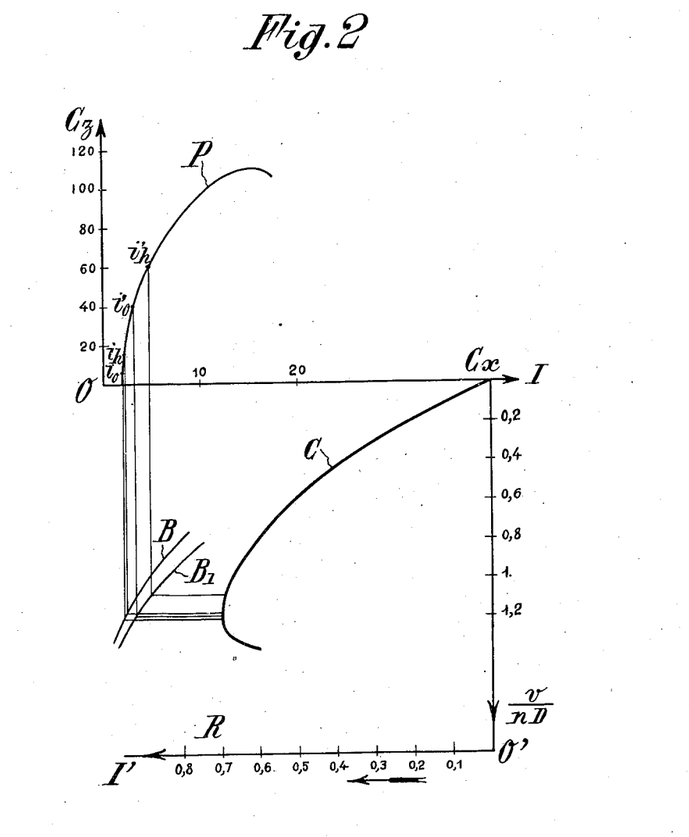
Fig. 2 is a diagram relating to the operation of an aircraft and its propelling system, this diagram being intended to facilitate a clear understanding of the present invention.

The diagram of Fig. 2 indicates the relations between the values of $Cx$, $$\frac{v}{n.D}$$

and the efficiency R of the propeller. In the upper part of this diagram (above axis OI) I have shown a polar curve P, the abscissas of which correspond to the values of $Cx$ and the ordinates of which correspond to the values of $Cz$ ($Cx$ and $Cz$ being the unitary drag and lift coefficients, respectively).

Below axis OI, I have shown two curves B and $B^1$ each of which indicates, for the same propeller but for different airplanes respectively, the value of $$\frac{v}{n.D}$$

as a function of $Cx$ plotted in abscissas. The ordinates of curves B and $B_1$ increase from top to bottom.

Finally, curve C indicates the values of the efficiency R of the propelling system as a function of $$\frac{v}{n.D}$$

The ordinates $$\frac{v}{n.D}$$

of curve C are identical to those of B or $B_1$, whereas the abscissas of this curve (indicated on axis O'—I') go increasing from right to left.

Considering first, by way of example, the usual case of airplanes to which their conditions of use impose a ratio of their extreme velocities averaging 4, the ratio of the lift coefficient $Cz$, which corresponds to the maximum velocity, and the maximum value of said coefficient on the polar curve of the airplane, must be equal to $\frac{1}{16}$. It follows that the value of $Cx$ is near its minimum value. This case is characterized, on the diagram of Fig. 2, by points $i_0$ and $i_h$, the first of which indicates the $C_x$ and $C_z$ utilized for flying at maximum speed close to the ground and the other the corresponding values for flying at a relatively high altitude, say 10,000 meters.

It will be seen, on curve B, that, for small variations of $C_x$ in the vicinity of the minimum values thereof, the values of $$\frac{v}{n.D}$$

decrease but slightly and correspond consequently to very small variations of the efficiency of the system in the vicinity of the maximum of curve R. The influence of the variations of $C_x$ on the efficiency can thus be neglected.

According to the present invention, it is therefore possible, in the case that is considered, which is the most usual case, to keep substantially constant in altitude the efficiency of a propeller driven by a receiving machine which is not mechanically coupled with the generators that cooperate therewith, by keeping the power of the receiving machine coupled with the propeller substantially uniform, and this by acting in a suitable manner upon the generators which feed motive fluid thereto.

Concerning more particularly the case of free piston generators, it is known that, for a given amount of fuel injected into the motor element of these machines, the pressure of the motive or discharge gases depends upon the pressure at which the gas enters the first compressor stages of the generators (called "feed pressure") and that the speed of oscillation or reciprocation of the latter depends upon their discharge pressure, therefore also upon their feed pressure.

The power supplied to the receiving machine, (turbine 3), which power is the product of the pressure and the rate of feed, therefore depends solely upon the feed pressure of said generators.

Figure 3:
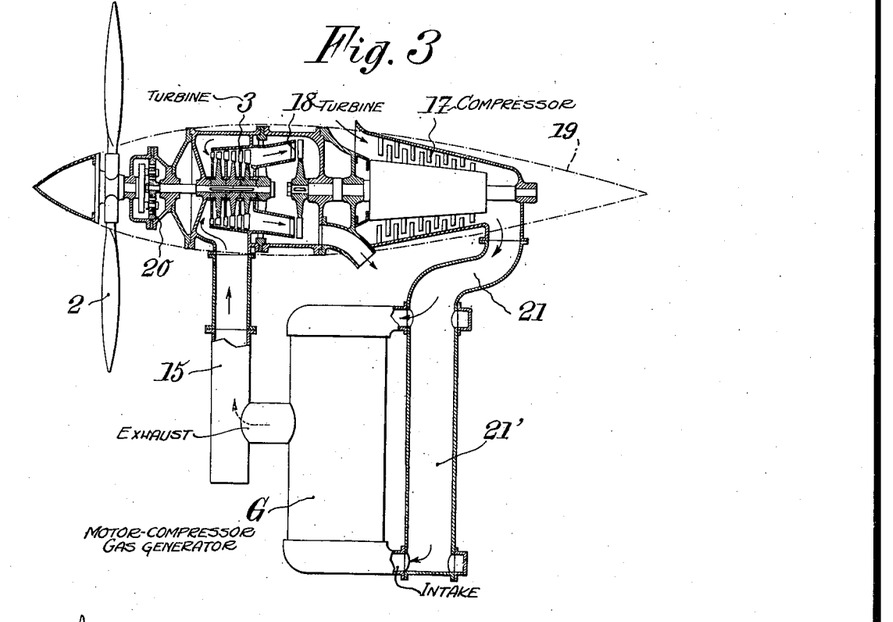
Fig. 3 shows, in a diagrammatic manner, means according to the present invention, for driving the propelling system of an aircraft.

A first embodiment of a regulation system according to the present invention is shown by Fig. 3, on which the two generators of Fig. 1 are diagrammatically shown as being grouped into a single generator shown at G.

According to this embodiment of my invention, in order to maintain the power supplied to the driving machine directly coupled with the propeller through a speed reducing gear 20 approximately uniform, I proceed as follows:

a. The rate of feed and the ratio of expansion in the driving turbine 3 are kept substantially uniform by feeding generator G through conduit 21 and manifold 21', by means of a compressor taking air at the external pressure and compressing said air up to a constant pressure; and b. This compressor is driven by means of a special turbine 18 disposed behind the main turbine 3, said turbine 18 causing the motive gases to expand from the uniform exhaust pressure of the motor turbine 3 down to the external pressure, which decreases with the altitude.

Furthermore, advantageously I choose a suitable ratio between the drop of pressure in turbine 18 and compressor 17. This ratio may be chosen as approximating 1, account being taken of the fact that the losses due to the imperfect efficiency of these engines are nearly wholly compensated by the excess of energy of the gases passing through turbine 18 with respect to the same mass of pure air passing through compressor 17, this excess being due to the fact that this last mentioned mass has a lower temperature.

Concerning first the compressor proper, it is made of any suitable type but it should be noted that a rotary compressor is especially well adapted. This results from the fact that, with such a compressor, the increase of the speed of revolution of the turbine 18 with which the compressor is coupled (this increase being caused by the decrease in the atmospheric pressure, which constitutes the back pressure, thus increasing the drop in pressure across turbine 18 since the exhaust pressure remains constant) enables the latter automatically to keep at a uniform value, when the altitude varies, the pressure and rate of feed of the compressed air supplied to generator G.

Such a regulation system therefore permits of keeping substantially constant, in altitude, the power of the motor-propelling plant of the aircraft and also the efficiency of its propelling system, provided, however, that the efficiencies of the turbines and the compressor are themselves kept at a substantially constant value.

Concerning now the motive turbine 3, which works with a substantially constant drop of pressure, its blades are designed in such manner that the small variations of the angles of operation resulting from the increase of the speed of revolution of the propeller when the altitude varies has but little influence upon the efficiency of this turbine. Advantageously, for this purpose, I make use, for the blades of said turbine, of angles and profiles which are little responsive to variations of speed.

It should be noted that the efficiencies of turbine 18 and compressor 17 remain satisfactory as a consequence of the concomitant variations of the speed of revolution and of the ratio of the pressures.

It is then possible, advantageously, as shown by Fig. 3, to arrange the rotary compressor 17 in such manner that its suction side is turned toward turbine 18. This arrangement permits of housing the whole of the turbines 3 and 18 and of the compressor 17 inside a streamlined fairing such as diagrammatically shown by the dotted lines marked 19.

This form of the invention operates as follows: Of course the speed of the turbine 18 increases whenever the pressure drop of its driving gas increases; also, the degree of compression of the compressor 17 increases when the speed of the compressor increases. These variations follow an exactly proportional law, but any variations from proportionality between the turbine 18 and the compressor 17 balance each other. In any event, assuming that the feed pressure of the turbine 18 remains constant, and that the exhaust pressure of this turbine decreases to the same extent as the intake pressure of compressor 17, the feed pressure of compressor 17 will likewise remain constant since the power with which turbine 18 drives compressor 17 remains in equivalence with the power utilized by said compressor to compress the air drawn in. Any variations in efficiency between the turbine 18 and the compressor 17 are so small that they can be neglected.

Of course the turbine operates at variable speeds as a function of the altitude. But the blades of the turbine have such angles and such profiles that the efficiency of the turbine varies very little with variations in the speed thereof. However, the power of the turbine does not vary with the altitude. As is shown above in Fig. 2, the power remains constant in most cases so as to assure automatically the constancy of the value $$\frac{v}{nD}$$

If the drop in pressure in the turbine 3 remains constant, as it will in the arrangement just described, the power of the turbine remains constant as long as the quantity of gas under pressure also remains constant. Variation in speed therefore has only a negligible influence.

Likewise variations in the temperature have no important effect. Up to any normal heights, the decrease of the outside temperature compensates the increase of the temperature caused by the increase in the degree of compression in the compressor 17. Above heights of about 5,000 yds. special measures may be necessary, as described below, to compensate for temperature variations.

Finally, variations in the oxygen content of the air are so slight that they may be disregarded.

Figure 4:
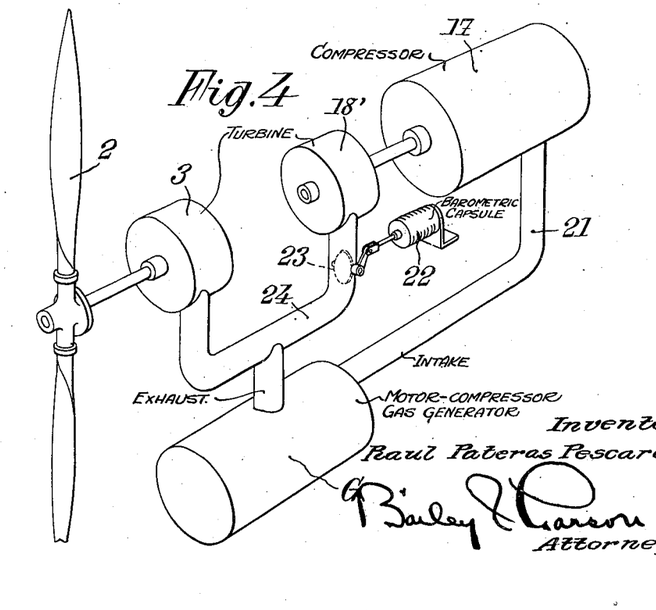
Fig. 4 shows, in perspective view, and in a diagrammatic manner, a modification of the means shown by the preceding view.

I may also, according to a modification, illustrated by Fig. 4, have compressor 17 driven by a turbine 18' mounted in shunt on the circuit of the motive gases with respect to turbine 3.

It will then be necessary to vary, as a function of the altitude, the speed and power characteristics of turbine 18'. For this purpose, I may for instance control the inflow of motive gases into said turbine through a device such, for example, as a barometric box 22 subjected to the action of the atmospheric pressure and arranged to actuate a valve 23 located inside the feed conduit 24 of turbine 18'. Valve 23 is closed as the atmospheric pressure rises and opened as the pressure decreases.

Figures 5, 7:
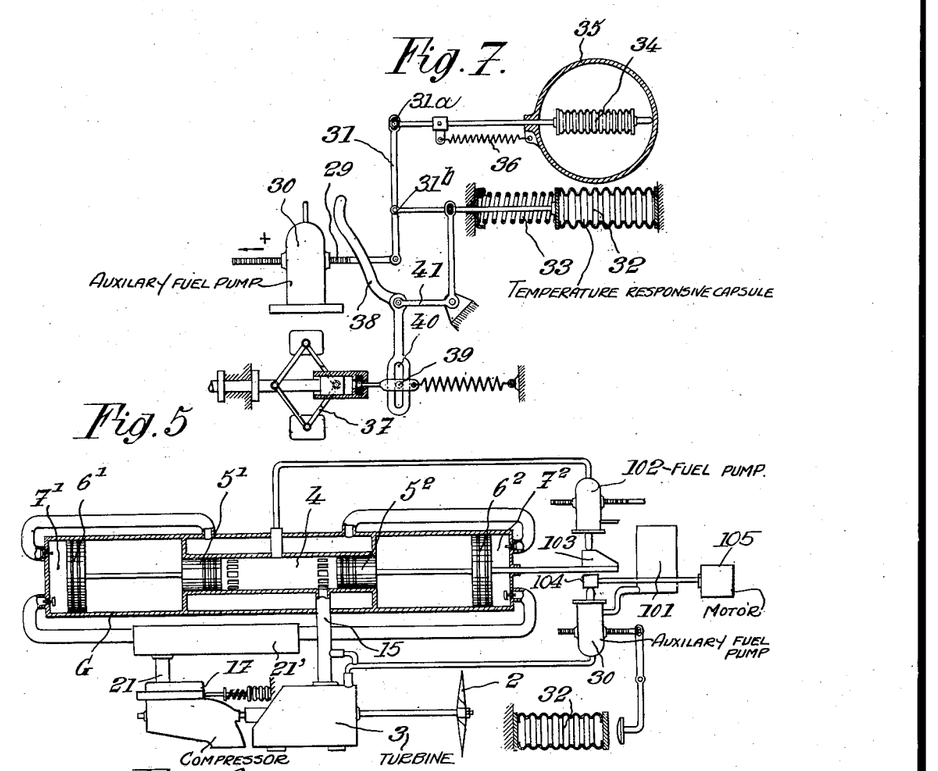
Fig. 5 shows still another modification of the means according to the present invention.
Fig. 7 shows a modification of the means for regulating the power.

I might also, according to another embodiment, illustrated by Fig. 5, have compressor 17 driven by turbine 3 itself. I have supposed in this case, by way of example, that the free piston generator G has only one stage of compression, its compressor cylinders $7^1$ and $7^2$ being fed through a manifold 21' and a conduit 21 connecting said manifold with compressor 17.

It is then necessary to act, preferably in an automatic manner, on certain factors of regulation of the discharge pressure of compressor 17, because the speed of revolution of said turbine 3 does not increase sufficiently quickly, when the altitude increases, for causing said compressor to be driven at speeds such that its discharge pressure is kept at a constant value.

Figure 6:
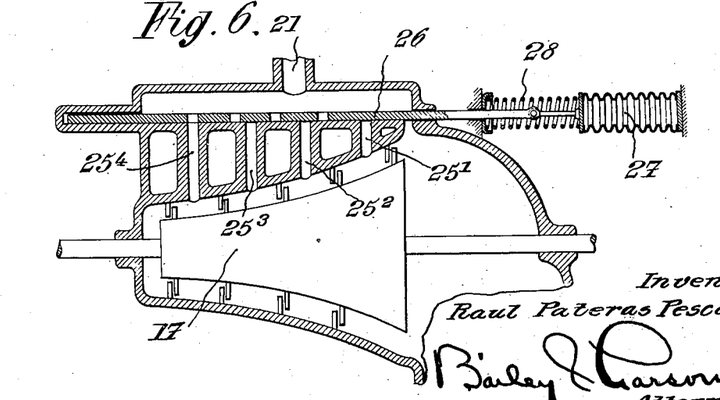
Fig. 6 shows, also in a diagrammatic manner, means for regulating the power supplied by said means, made according to one feature of the invention.
Figure 8:
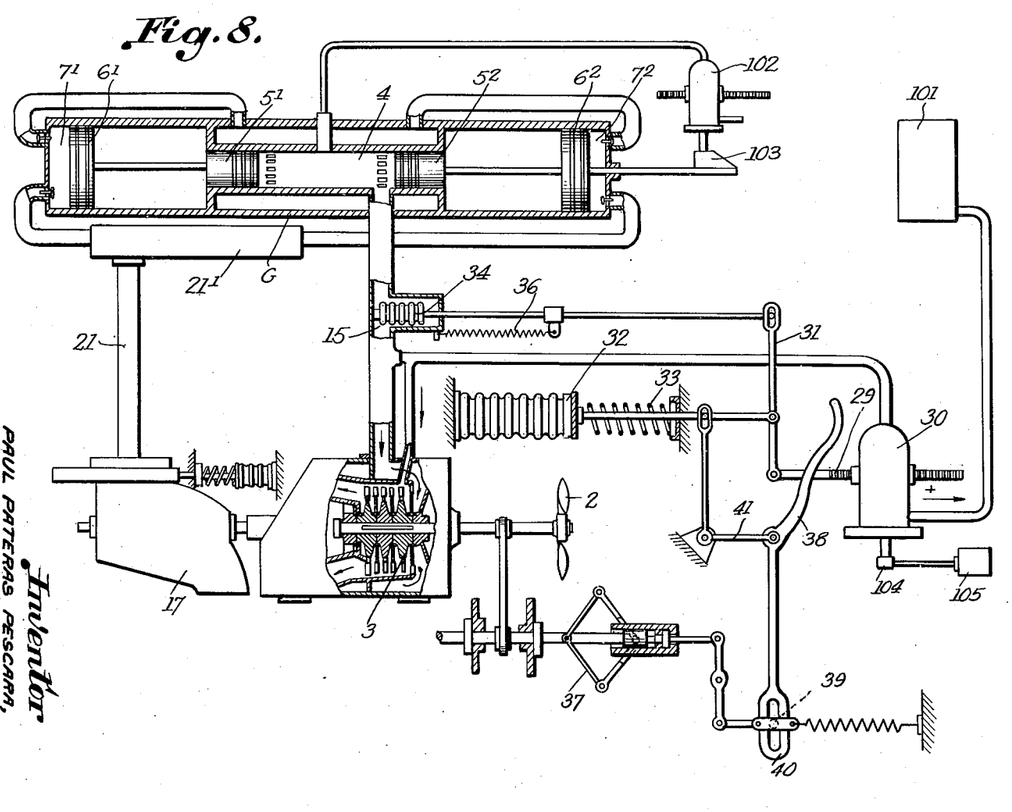
Fig. 8 shows in combination the control mechanism of Figs. 5 and 7.

It is, in particular, possible to act on the discharge pressure of compressor 17, as shown by Fig. 6, by providing a distribution system owing to which the feed conduit 21 of the compressor cylinders of generator G can be brought into communication with one or the other of the successive stages of compression of compressor 17. This system may, for instance, be constituted by a series of by-pass connections $25^1$ to $25^4$, controlled by a slide valve 26.

I provide, in cooperation with the regulation member of this distribution system, that is to say with slide valve 26, a control device, preferably of the automatic type, which may be constituted, for instance, by a barometric box 27, subjected to the action of the atmospheric pressure, a return spring 28 being advantageously provided which tends to short-circuit the stages of the compression, starting from the lowest for the highest atmospheric pressures, that is to say the lowest altitudes.

It should be noted that it is advantageous to provide that compressor 17 has a maximum efficiency for an altitude corresponding to the most usual altitude employed, and that this efficiency increases when rising from the ground up to this altitude.

Also, it will be readily understood that, by proceeding as above described, it is possible to keep at a constant value up to a certain altitude the feed pressure of the generator and the power transmitted by turbine 3 to the propeller.

In the case which has just been considered, I will preferably determine the characteristics of turbine 3, according to another feature of my invention, in such manner that this turbine has its optimum efficiency for the most usual altitude employed, therefore for the most usual speed, in such manner in particular that at the altitude in question said turbine can transmit the maximum of power to compressor 17.

Up to now, I have considered the most current case, in which the aircraft is made in such manner that the efficiency of its propelling system is kept substantially constant when the power transmitted thereto is itself kept substantially constant, which is obtained by maintaining the pressure of feed of the generators at a substantially constant value. Under these conditions, the amount of fuel burnt in these generators would not vary if the temperature of the feed air of these engines remained substantially constant. This result can be obtained practically, with compressors of good efficiency, up to a limit altitude below which the external temperature decreases rapidly when the altitude increases, but this reduction of the value of the temperature is compensated by the increase of the ratio of compression in compressor 17, or, to be more accurate, by the increase of the heat of compression in said compressor.

Above this limit altitude, the temperature of the air compressed by compressor 17 would increase simultaneously with the ratio of compression.

It is then possible, in order to obviate this drawback, to act in either of the two following ways:

a. Either to keep the temperature of the feed air of the generators constant, same as its pressure, for instance by cooling this compressed air in a radiator from the limit altitude; or b. In a more simple manner, to introduce the compressed air into the generators at a temperature which increases with the altitude, and to compensate for the loss of power resulting from the reduction of the mass of air flowing through the generators by a suitable increase of the amount of fuel to be injected.

Generally, aircrafts are designed in such manner as to be able to fly at speeds ranging inside a relatively wide interval, corresponding for instance to speed variations from 4 to 1, which leads, as above explained, to making use, at top speeds, of flying angles for which the unitary drag coefficient $Cx$ varies but very little when the altitude varies. However, cases may occur in which the range of speed variations can be obtained through other means, such for instance as lift increasing devices.

It may happen that the conditions of use of the aircraft necessitate but a realtively narrow range of speed variations, for instance when the aircraft is to land after its weight has been considerably reduced. In such cases, the aircraft can be designed in such manner as to utilize, at the most current speed, economical angles corresponding to the intermediate portion of the polar curve, the corresponding points being, for instance, $i'_o$ near the ground and $i'_h$ at altitude $h$.

It results from the diagram of Fig. 2 that, in this case, coefficient $Cx$ varies in a substantial manner when the altitude varies. But an examination of curve $B_1$ (relative to an airplane for which the range of speed variation is relatively narrow) shows that the efficiency in the vicinity of its maximum varies but very little, even for variations of $Cx$ of the order of magnitude of 30 or 40 per cent. However, for such variations of $Cx$, the power that is necessary is not constant but must increase when the altitude increases, according to a certain law.

Now, the mere increase, in correspondence with an increase of the altitude, of the feed pressure of the free piston generators is not sufficient for keeping the efficiency of the propelling system of the aircraft at a constant value because the maximum value of the power of said generators is obtained for a feed pressure of well determined value beyond which their power ceases to increase.

It would then be possible to underfeed the generators at the lower altitudes but this solution has the disadvantage of making it necessary to increase the size of the generators and, consequently, to reduce their power per unit of mass.

I may then have recourse to another feature of the present invention, which can be used independently of those above set forth. According to this feature, I increase the power available in turbine 3 (or I keep this power constant if compressor 17 does not permit by itself of obtaining this result) by effecting, in the whole of the "generator-turbine" system, a supplementary introduction of fuel, preferably through the action of an automatic device, such, for instance, as a barometric box 32, as it will be hereinafter explained in a more explicit manner.

When the generator is of the auto-generator type with scavenging under pressure, as above referred to, the motive gases always contain an excess of scavenging air, and therefore of uncombined oxygen, which permits, according to various embodiments of the last mentioned feature, of introducing supplementary fuel in the form of a direct injection into the motive gases under pressure.

In this case, I will preferably provide a continuous injection by means of a pump 30 fed for instance from a source of fuel 101 and operated by a cam 104 driven by a motor 105, the main injection being effected, for instance, by means of a pump 102 controlled by a cam 103 carried by the reciprocating parts of the machine.

This injection under pressure, which is preferably controlled automatically as a function of the altitude, can be made in any of the following manners:

a. Either into turbine 3, for instance between two stages of expansion thereof;

b. Or between cylinder 4 and turbine 3;

c. Or again, as shown by Fig. 5, simultaneously into turbine 3 and ahead of said turbine.

It should be noted that the supplementary injection of fuel behind cylinder 4 will be effected at high altitudes with a satisfactory thermic efficiency owing to the fact that the ratio of expansion of the gases in the turbine increases with the altitude.

This arrangement has the advantage, among others, of permitting of increasing the power of the generator-turbine systems without increasing the size of these apparatus.

It further permits of increasing temporarily the power at any altitude, even close to the ground so as to facilitate the taking-off. However, it has the disadvantage of increasing the temperature of the motive gases in proportion with the amount of supplementary fuel that is injected.

Whatever be the embodiment that is chosen, the means above described permit of regulating the power of a generator-turbine system for an aircraft, and, in particular, of varying this power as a function of the altitude in accordance with the law for which the propelling system of said aircraft works with the optimum efficiency.

My invention further includes other features adapted, in particular, to be used in combinations with the arrangements above described.

According to one of these features, which will be supposed, by way of example, to be embodied in a structure of the type above described, the supplementary amount of fuel injected into the circuit of the motive gases as a function of the altitude is modified in accordance with the temperature of said motive gases, and this in such manner that a rise of said temperature produces a reduction of the supplementary amount of fuel, so as to avoid temperatures of the motor element which would impair the proper working thereof.

For this purpose, I may advantageously, by way of example, have recourse to the embodiment shown by Fig. 7 of the drawings, according to which there is associated with the control member 29 of the pump 30 which ensures the supplementary injections of fuel, a lever 31 which is caused to coact with the following elements:

a. On the one hand a barometric deformable box 32 subjected to the action of a spring 33 which tends to swing lever 31 in the direction which reduces the amount of fuel injected when said box is flattened, that is to say when the altitude decreases; and b. On the other hand a thermostatic device, such for instance as a thermostatic deformable box 34, which is placed on the inside of conduit 15 through which the motor exhaust gases flow (see Fig. 5), for instance in such manner that said box bears against the wall of said conduit, a return spring 36 being then provided which tends to swing lever 31 in the direction which corresponds to an increase of the amount of fuel injected (direction indicated by sign) when said box contracts.

According to another feature of my invention, I provide a regulation of the supplementary amount of fuel that is injected, or at least a limitation of its maximum value, as a function of the speed of revolution of turbine 3 and of the propeller driven by said turbine, and for this purpose, for instance, I cause a centrifugal governor 37 driven by said turbine to coact with one of the ends of a lever 38 which moves in the same plane as lever 31 so that its other end constitutes an abutment capable of limiting the movement of lever 31.

Furthermore, I may further correct this last mentioned regulation as a function of the altitude in such manner as to permit the limit speed of the propeller to increase with the altitude, at the same time as the supplementary injection of fuel increases.

For this purpose, by way of example, the position of the pivot point of said centrifugal governor 37 with lever 38 is caused to depend upon atmospheric pressure.

In the embodiment illustrated by the drawings, this centrifugal governor and lever 38 coact together through the intermediate of a finger 39 subjected to the action of governor 37 and slidably mounted in an eye or slot 40 provided for this purpose in said lever 38.

This last mentioned lever is pivotally connected through its middle part to one of the ends of a bell crank lever 41, the other end of which is caused to coact in such manner with the barometric deformable box 32 that, when the altitude increases, the point at which lever 38 is pivoted to lever 41 moves toward finger 39. In this way, the displacements of the end of lever 38, which acts as an abutment, become more important and consequently the upper limit of the amount of fuel injected increases.

The operation of this construction is as follows: As the airplane rises, assuming that the temperature of the gases in passage 15 remains unchanged, the barometric capsule 32 expands because of the increase in altitude, and the resulting decrease in atmospheric pressure. This causes lever 31 to rock about the upper pivot 31a, which remains stationary since the temperature has not changed. The lever 31 then rocks so as to shift rack 29 in a direction to increase the fuel. On the contrary, when the altitude decreases and the atmospheric pressure increases, capsule 32 rocks lever 31 in the opposite direction so as to shift rack 29 in the direction to reduce the feed of fuel.

Assuming, on the contrary, that the temperature of passage 15 increases while the altitude and pressure remain unchanged, pivot 31b remains stationary. An increase in temperature then causes the capsule 34 to expand and to turn lever 31 in a direction to move rack 29 to reduce the feed of fuel. When the temperature decreases, of course rack 29 is moved in the opposite direction.

Obviously when the temperature of the gas and the atmospheric pressure vary simultaneously the position of lever 31 deepnds on a combination of the two.

The governor 37 moves the abutment 38, which limits the movement of lever 31 in a direction to increase the fuel supply, so that when a certain speed is reached with a certain position of lever 31 any increase in the feed of fuel from the pump 30 is prevented.

I might also make use of some of the devices in question for varying the power of generator-turbine systems used in connection with structure other than aircrafts.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an aircraft, the combination of propelling means for said aircraft, a turbine for driving said propelling means, at least one motor generator of the free piston type for feeding gas under pressure to said turbine, at least one auxiliary compressor taking air from the atmosphere and feeding it under pressure to said motor generator, said compressor having a variable rate of compression, a turbine for driving said auxiliary compressor fed with the gases escaping at constant pressure from the first mentioned turbine, said second mentioned turbine discharging its gases into the atmosphere, so that said auxiliary compressor feeds air at constant pressure to said motor generator.

2. In an aircraft, the combination of propelling means for said aircraft, a turbine for driving said propelling means, at least one motor generator of the free piston type for feeding gas under pressure to said turbine, at least one auxiliary compressor taking air from the atmosphere and feeding it under pressure to said motor generator, said compressor having a variable rate of compression, a turbine for driving said auxiliary compressor located in line with said first mentioned turbine and behind it, and means for feeding the gases escaping at constant pressure from the first mentioned turbine to the second mentioned turbine, said second mentioned turbine discharging its gases into the atmosphere, so that said auxiliary compressor feeds air at constant pressure to said motor generator.

3. In an aircraft, the combination of propelling means for said aircraft, a turbine for driving said propelling means, at least one motor generator of the free piston type for feeding gas under pressure to said turbine, at least one auxiliary compressor of the rotary type mounted in line with said turbine, with its suction side toward said turbine, said compressor having a variable rate of compression and being adapted to take air from the atmosphere and to feed it under pressure to said motor generator, and a turbine for driving said compressor mounted in line between said first mentioned turbine and said compressor and fed with the exhaust gases escaping at constant pressure from said first mentioned turbine, said second mentioned turbine discharging its gases into the atmosphere, so that said auxiliary compressor feeds air at constant pressure to said motor generator.

4. In an aircraft, the combination of propelling means for said aircraft, a turbine for driving said propelling means, at least one motor generator of the free piston type adapted to feed gas under pressure to said turbine, at least one auxiliary compressor taking air from the atmosphere and feeding it under pressure to said motor generator, said compressor having a variable rate of compression, a turbine for driving said auxiliary compressor fed with the gases escaping at constant pressure from the first mentioned turbine, said second mentioned turbine discharging its gases into the atmosphere so as to have a variable rate of expansion substantially equal to the rate of compression of said auxiliary compressor, whereby said auxiliary compressor feeds air at a constant pressure to said motor generator.

5. In an aircraft, the combination of propelling means for said aircraft, a streamlined body, a turbine within said body for driving said propelling means, at least one motor generator of the free piston type for feeding gas under pressure to said turbine, at least one auxiliary compressor within said body taking air from the atmosphere in the rear portion of said body and feeding it under pressure to said motor generator, said compressor having a variable rate of compression, a turbine for driving said auxiliary compressor located within said body in line with said first mentioned turbine and behind it, and means for feeding the gases escaping at constant pressure from the first mentioned turbine to the second mentioned turbine, said second mentioned turbine discharging its gas from said body into the atmosphere, so that said auxiliary compressor feeds air at constant pressure to said motor generator.

6. In an aircraft, a combination of propelling means for said aircraft, a streamlined body, a turbine within said body for driving said propelling means, at least one motor generator of the free piston type for feeding gas under pressure to said turbine, at least one auxiliary compressor of the rotary type mounted within said body in line with said turbine with its suction side towards said turbine, said compressor having a variable rate of compression and being adapted to take air from the atmosphere in the rear portion of said body and to feed it under pressure to said motor generator, and a turbine for driving said compressor mounted within said body in line with said first turbine and said compressor and fed with the exhaust gases escaping at constant pressure from said first mentioned turbine, said second mentioned turbine discharging its gases from said body into the atmosphere, so that said auxiliary compressor feeds air at constant pressure to said motor generator.

7. In an aircraft, the combination of a propelling means for the aircraft, a gas turbine for driving said propelling means, at least one two-cycle motor-generator of the free piston type producing gases of combustion and feeding such gases under pressure to said turbine, at least one compressor driven by said generator having a variable rate of compression adapted to feed gas to said generator, and means, responsive to variations in the altitude of the aircraft, for increasing the rate of compression of said compressor as the altitude increases.

8. In an aircraft, the combination of a propelling means for the aircraft, a gas turbine for driving said propelling means, at least one two-cycle motor-generator of the free piston type producing gases of combustion and feeding such gases under pressure to said turbine, at least one compressor driven by said generator having a variable rate of compression taking air from the atmosphere and feeding it under pressure to said generator, and means, responsive to variations in the altitude of the aircraft, for increasing the rate of compression of said compressor as the altitude increases so as to feed air at constant pressure to said generator.

9. In an aircraft, the combination of a propelling means for the aircraft, a gas turbine for driving said propelling means, at least one two-cycle motor-generator of the free piston type producing gases of combustion and feeding such gases under pressure to said turbine, at least one compressor having a variable rate of compression taking air from the atmosphere and feeding it under pressure to said generator, a second turbine for driving said compressor, means to supply such combustion gases to said second turbine, and means for regulating said second turbine to operate at a rate increasing with increases in the altitude of the aircraft, so as to feed air at constant pressure to said generator.

10. In an aircraft, the combination of a propelling means for the aircraft, a gas turbine for driving said propelling means, at least one two-cycle motor-generator of the free piston type producing gases of combustion and feeding such gases under pressure to said turbine, at least one compressor having a variable rate of compression taking air from the atmosphere and feeding it under pressure to said generator, a second turbine for driving said compressor fed with combustion gases under pressure from said generator in shunt with said first turbine, and means for regulating the rate of feed of combustion gases to said second turbine in accordance with the altitude of said aircraft, so that said compressor feeds air at constant pressure to said motor generator.

11. In an aircraft, the combination of a propelling means for the aircraft, a gas turbine for driving said propelling means, at least one two-cycle motor-generator of the free piston type producing gases of combustion and feeding such gases under pressure to said turbine, at least one compressor driven by said generator taking air from the atmosphere and feeding it under pressure to said generator, said compressor having a variable ratio of compression and including a plurality of compression stages, and means responsive to increases in the altitude of said aircraft, for short-circuiting a decreasing number of said stages so that said compressor feeds air at constant pressure to said motor generator.

12. In an aircraft, the combination of a propelling means for the aircraft, a gas turbine for driving said propelling means, at least one two-cycle motor-generator of the free piston type producing gases of combustion and feeding such gases under pressure to said turbine, at least one compressor driven by said generator taking air from the atmosphere and feeding it under pressure to said generator, said compressor being of the variable compression type and including a plurality of stages of compression, a slide-valve adapted to control said compressor so as to short circuit a variable number of said stages of compression, and barometric means, responsive to the altitude of said aircraft, for operating said slide valve in accordance with said altitude to short circuit a decreasing number of stages as the altitude increases, so that said compressor feeds air at constant pressure to said generator.

RAUL PATERAS PESCARA.